(12) United States Patent
Gardner et al.

(10) Patent No.: US 8,720,195 B2
(45) Date of Patent: May 13, 2014

(54) EXHAUST ASSEMBLY

(75) Inventors: Jeffrey L. Gardner, Hudson, IA (US);
Brian T. Brown, Waterloo, IA (US);
Gary S. Keys, II, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 137 days.

(21) Appl. No.: 13/396,115

(22) Filed: Feb. 14, 2012

(65) Prior Publication Data

US 2013/0205759 A1   Aug. 15, 2013

(51) Int. Cl.
*F01N 5/04* (2006.01)
*F01N 3/22* (2006.01)
*F01N 13/08* (2010.01)

(52) U.S. Cl.
CPC .... *F01N 3/22* (2013.01); *F01N 13/08* (2013.01); *F01N 13/082* (2013.01)
USPC ............ 60/319; 60/289; 60/298; 60/316; 60/320

(58) Field of Classification Search
CPC ............ F01N 3/22; F01N 3/30; F01N 13/08; F01N 13/082
USPC ............ 60/272, 289, 298, 316, 317, 319, 320
See application file for complete search history.

(56) References Cited

U.S. PATENT DOCUMENTS

| | | | |
|---|---|---|---|
| 2,055,453 A * | 9/1936 | Horton .................. | 181/262 |
| 3,186,511 A * | 6/1965 | Kliewer, Sr. .......... | 181/259 |
| 3,227,240 A * | 1/1966 | Lee et al. .............. | 181/217 |
| 4,018,046 A * | 4/1977 | Hurley .................. | 60/264 |
| 4,020,915 A * | 5/1977 | Darnell et al. ........ | 180/309 |
| 5,174,113 A | 12/1992 | Deville | |
| 5,176,407 A | 1/1993 | Vaughn et al. | |
| 7,051,524 B1 | 5/2006 | Kraft | |
| 7,281,530 B2 * | 10/2007 | Usui .................... | 123/568.17 |
| 7,418,957 B2 * | 9/2008 | Abe ..................... | 123/697 |
| 8,056,327 B2 | 11/2011 | Brown et al. | |
| 8,341,948 B2 * | 1/2013 | Freese .................. | 60/298 |
| 2005/0103003 A1 | 5/2005 | Crombeen | |
| 2007/0012495 A1 | 1/2007 | Shannon, Jr. et al. | |
| 2007/0261399 A1 | 11/2007 | Mallampalli et al. | |
| 2009/0282818 A1 | 11/2009 | Keller | |
| 2010/0000205 A1 | 1/2010 | Freese | |
| 2010/0146956 A1 | 6/2010 | Grudynski, III | |

FOREIGN PATENT DOCUMENTS

DE   102009046253   5/2011
WO   2009032183   3/2009

OTHER PUBLICATIONS

Gardner, Jeffrey L., Side Exhaust Venturi [Power Point Presentation], Dec. 13, 2011, 6 pages.
Helferich, Bernd. Horizontal Exhaust IT4 With injection Pump [Power Point Presentation], Sep. 16, 2011, 5 pages.
International Search Report and the Written Opinion of the International Searching Authority dated Apr. 8, 2013 (6 pages).

* cited by examiner

*Primary Examiner* — Binh Q Tran

(57) ABSTRACT

An exhaust assembly includes an exhaust pipe, a first venturi member at the inlet end of the pipe and a second venturi member at the outlet end of the pipe. A diffuser/mixer is mounted at the outlet end of the exhaust pipe. A shield pipe surrounds a portion of the exhaust pipe. A shield member is mounted to the shield pipe and covers a portion of the first venturi member. The first and second venturi members operate to combine ambient air with exhaust gases.

13 Claims, 6 Drawing Sheets

EXHAUST ASSEMBLY

FIELD OF THE INVENTION

The present disclosure relates to an exhaust assembly.

BACKGROUND OF THE INVENTION

To meet emissions regulations, vehicles, such as tractors have been provided exhaust systems which include an exhaust filter which performs a regeneration process. Such a system can produce elevated exhaust temperatures during idle conditions. It is desired to provide an exhaust system which produces lower exhaust temperatures. A shielded exhaust pipe exiting into ambient air alone will not have adequate gas mixing in order to lower the exhaust gas temperatures.

SUMMARY

According to an aspect of the present disclosure, an exhaust assembly includes an exhaust pipe having ah inlet end and an outlet end. A first venturi member has an inlet end adapted to receive exhaust gas from an engine, and has an outlet end received by the inlet end of the exhaust pipe. The exhaust pipe inlet end is spaced apart from and surrounds the outlet end of the first venturi member. A second venturi member has an inlet end receiving the outlet end of the exhaust pipe, and has an outlet end opening to the atmosphere. The inlet end of the second venturi member is spaced apart from and surrounds the outlet end of the exhaust pipe. A diffuser/mixer is mounted at the outlet end of the exhaust pipe. The diffuser/mixer projects into and is received by an upstream end of the second venturi member. A shield pipe surrounds a portion of the exhaust pipe. A shield member has a first end mounted to the shield pipe. The shield member covers a portion of the first venturi member.

DETAILED DESCRIPTION OF THE DRAWINGS

Figure 1:
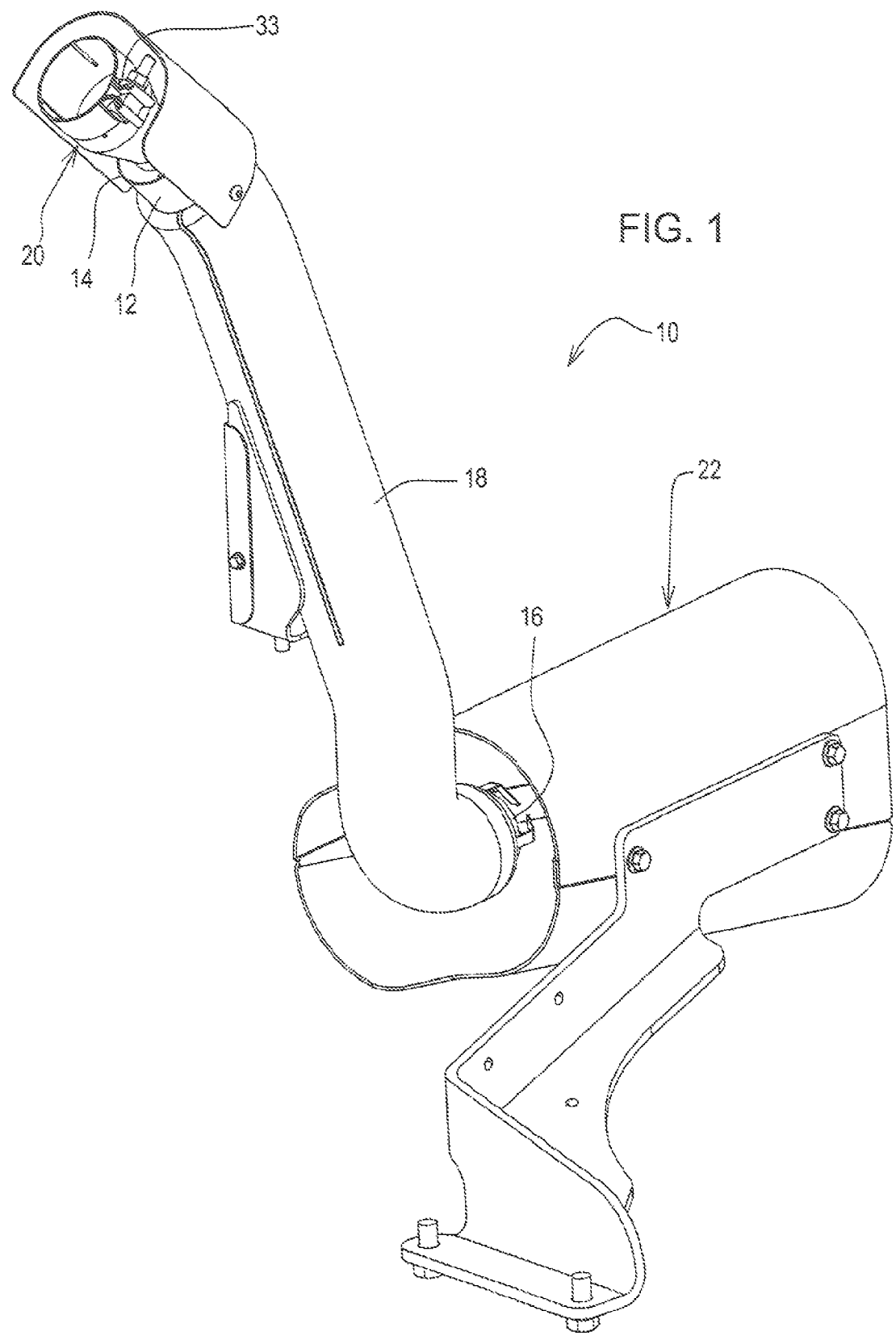
FIG. 1 is a perspective view of an exhaust assembly embodying the invention.
Figure 2:
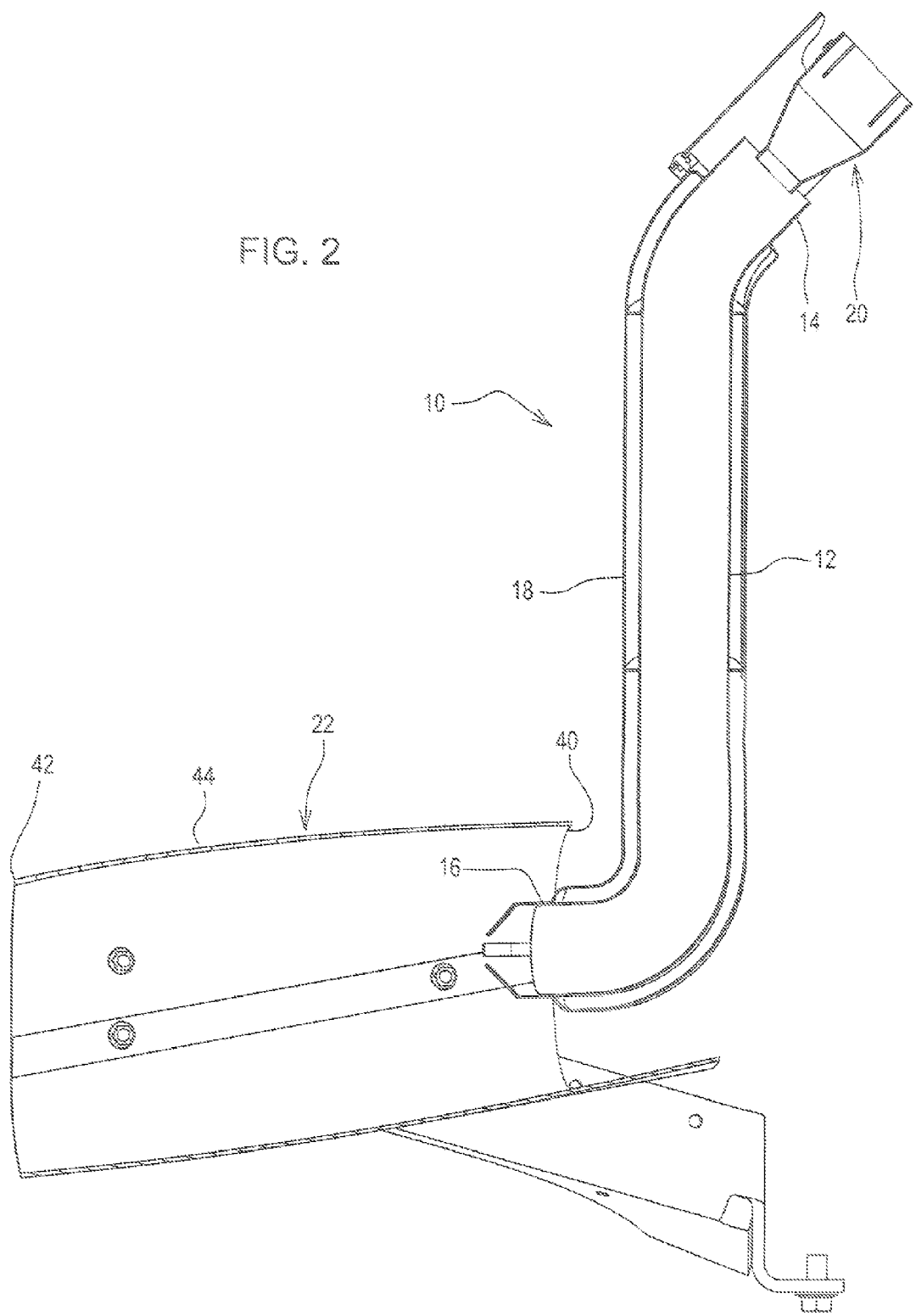
FIG. 2 is a sectional view of the exhaust assembly of FIG. 1.

Referring to FIGS. 1 and 2, an exhaust assembly 10 includes an exhaust pipe 12 having an inlet end 14 and an outlet end 16. Most of the exhaust pipe 12 is surrounded by a shield pipe 18, while the an inlet end 14 and an outlet end 16 of the exhaust pipe pipe project out of the ends of the shield pipe.

Figure 3:
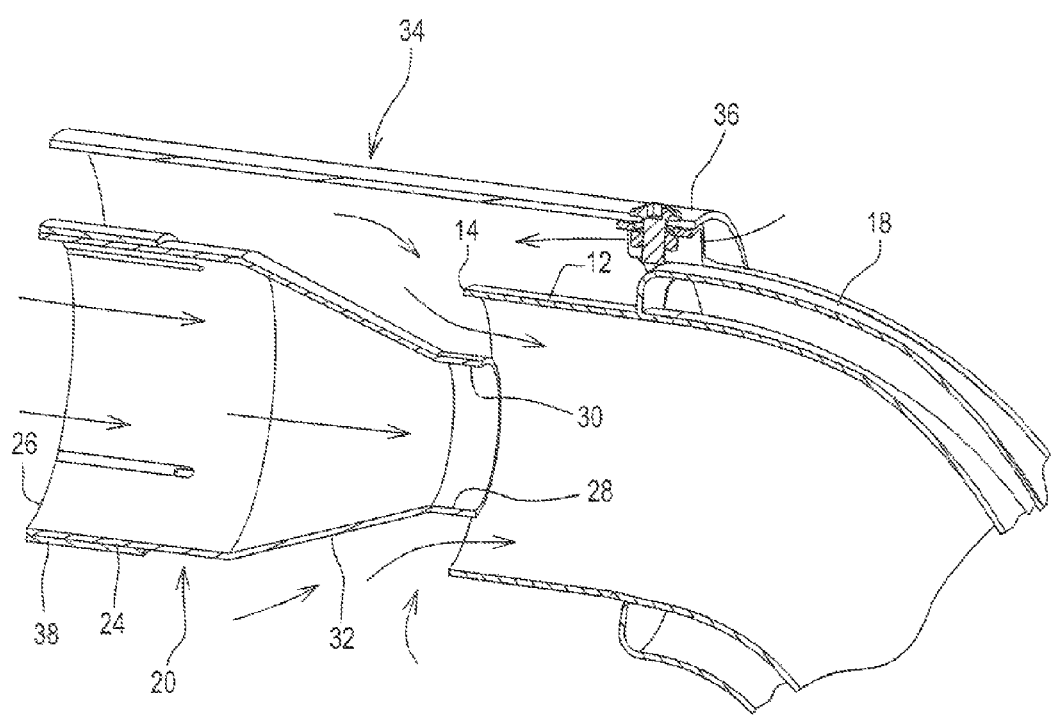
FIG. 3 is a detailed sectional view of the upstream end portion of the exhaust assembly of FIG. 1.

The exhaust assembly 10 also includes a first or inlet venturi member 20 and a second or outlet venturi member 22. As best seen in FIGS. 2 and 3, first venturi member 20 includes a larger uniform diameter cylindrical portion 24 forming an inlet end 26 and a smaller uniform diameter cylindrical portion 28 forming an outlet end or nozzle 30. Portions 24 and 28 are joined together by a tapered frustoconical portion 32. Outlet end 30 is spaced apart from and received by inlet end 14 of exhaust pipe 12. The inlet venturi nozzle 30 is centered in the inlet end 14 of the exhaust pipe 12 and is held in that position by a clamp 33 which is attached to the engine (not shown). There need hot be a direct rigid connection between the inlet venturi member 20 and the exhaust pipe 12.

An annular space is formed between the outlet end 30 of the first venturi member 20 and the inlet end 14 of exhaust pipe 12. When exhaust gas flows through first venturi member 20 and into the inlet end 14 of exhaust pipe 12, a venturi effect draws ambient air into the exhaust pipe to join with and cool the exhaust gases.

Figure 6:
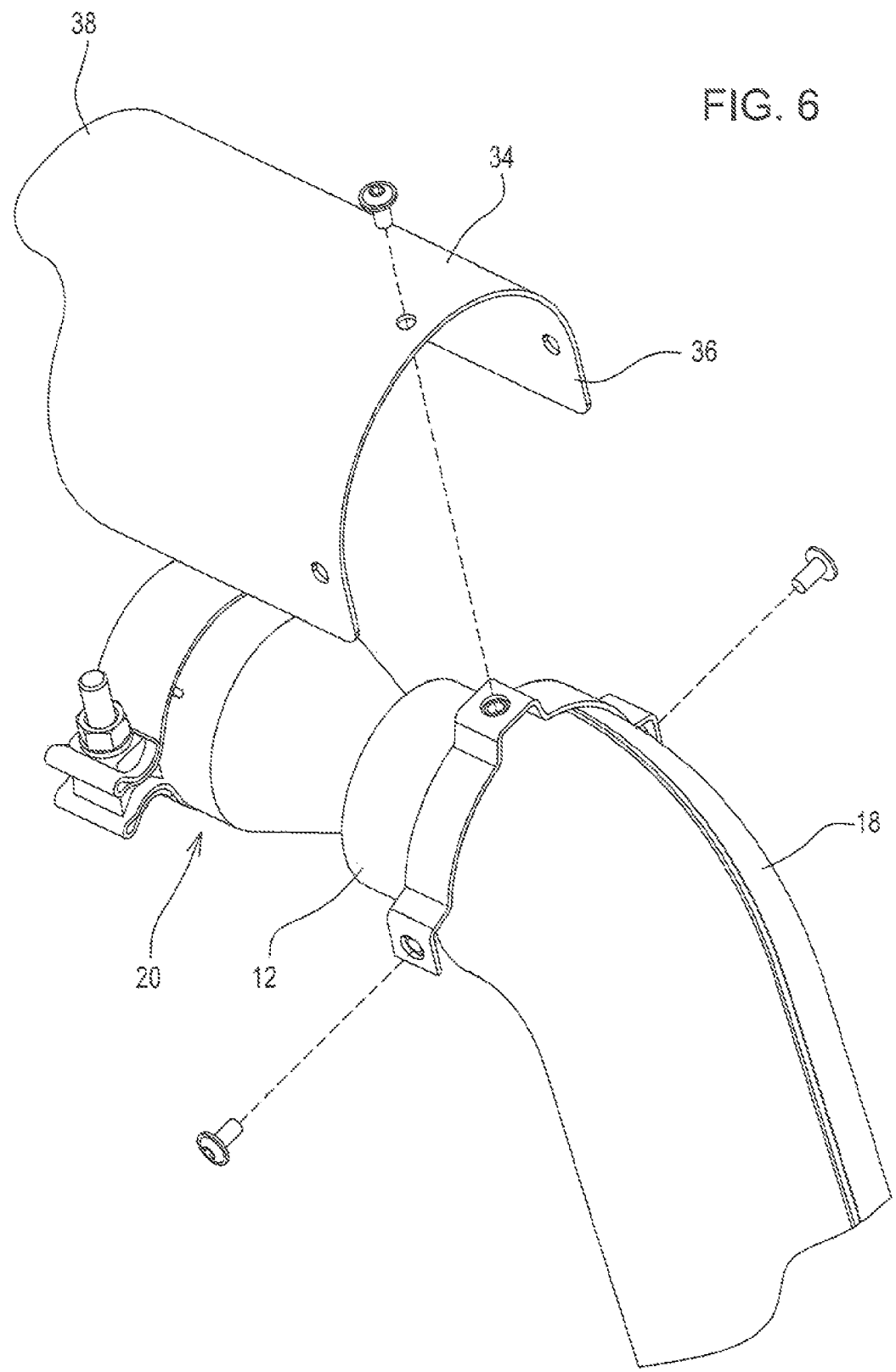
FIG. 6 is a perspective view of the upstream end of the exhaust assembly of FIG. 1.

As best seen in FIGS. 1 and 6, a shield member 34 has a downstream end 36 attached by three screws to an outer surface of the shield pipe 18 and an upstream end 38. The shield 34 partially surrounds the inlet venturi member 20 and the upstream end of exhaust pipe 12, and acts as a cover to prevent debris from entering the annular space between inlet venturi member 20 and the upstream end of exhaust pipe 12.

Figure 4:
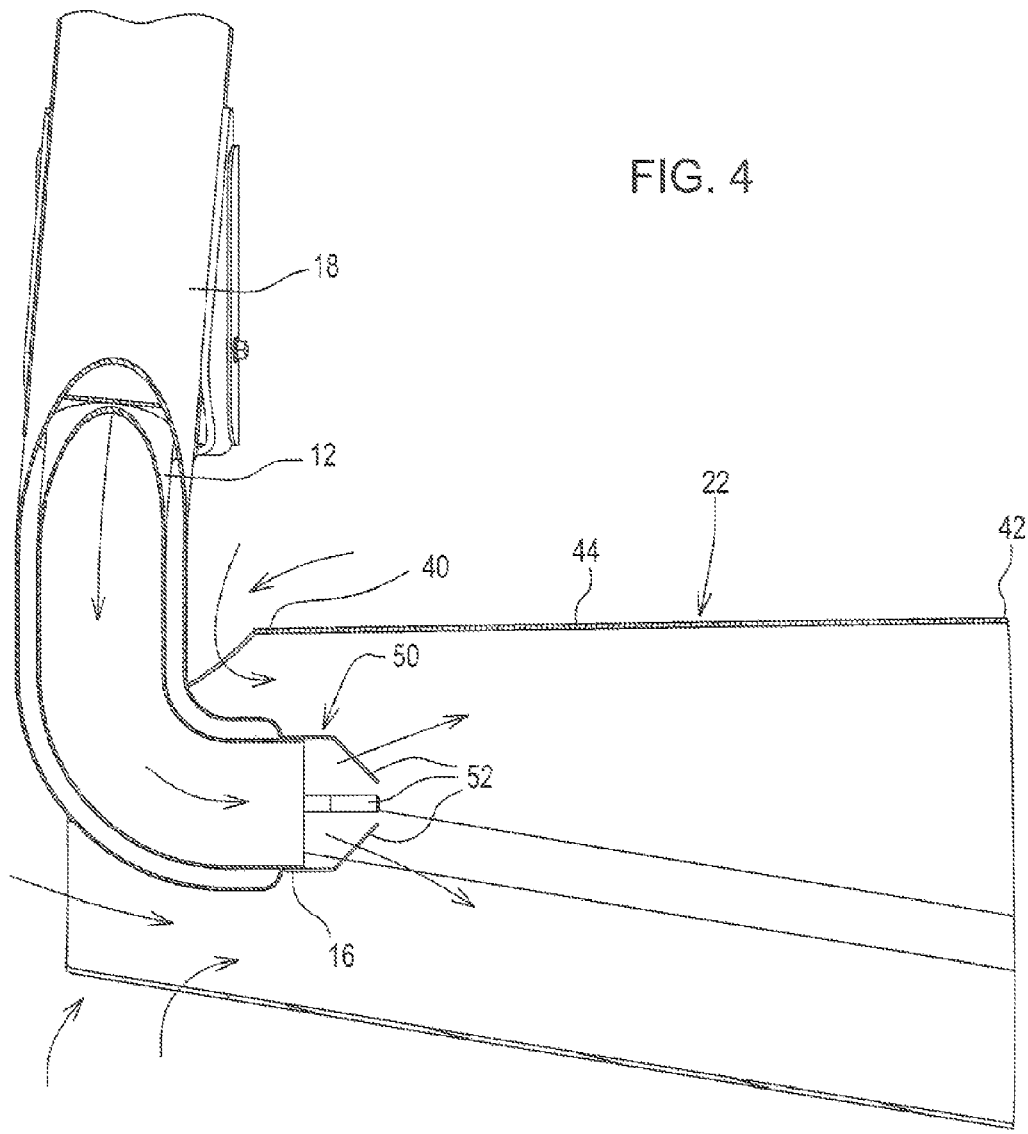
FIG. 4 is a detailed sectional view of the downstream end portion of the exhaust assembly of FIG. 1.

As best seen in FIGS. 2 and 4, the second venturi member 22 has a smaller diameter inlet end 40 which is spaced apart from and which receives the outlet end 16 of the exhaust pipe 12. The second venturi member 22 also has a larger diameter outlet end 42 which opens to the atmosphere. Ends 40 and 42 are joined together by a tapered body 44. The first and second venturi members 20 and 22 operate to combine ambient air with exhaust gases.

Figure 5:
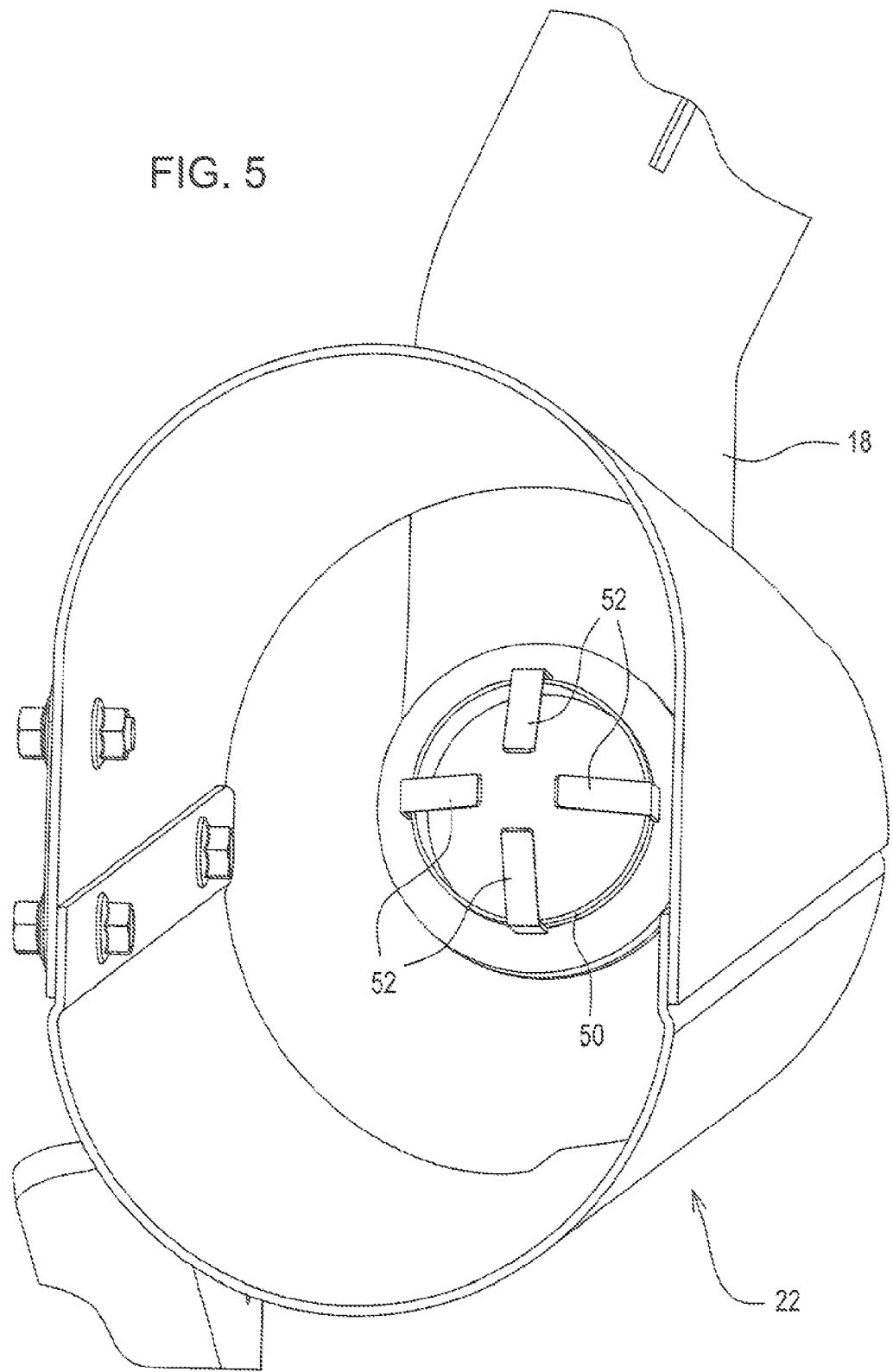
FIG. 5 is a perspective view of the downstream end of the exhaust assembly of FIG. 1.

As best seen in FIGS. 4 and 5, a diffuser or mixer 50 is mounted at the outlet end 16 of the exhaust pipe 12. The diffuser 50 has a plurality of tabs 52 which project downstream and radially inwardly into the stream of exhaust gas as it exits the exhaust pipe 12. The diffuser 50 diffuses the exhaust and ambient air mixture which flows out of the downstream end of exhaust pipe 12 and further mixes it with additional ambient air which flows into the upstream end of second venturi member 22.

The result is a side exhaust system 10 which includes a primary venturi at the inlet end of the exhaust pipe 12 together with a second venturi and mixing chamber at the exhaust outlet of the exhaust pipe 12. The exhaust flowing through the primary venturi will create a low pressure zone to draw in ambient air between the exhaust pipe 12 and the inserted nozzle 30 for the initial exhaust cooling. A secondary venturi system downstream near the exhaust outlet will allow additional cooling of the exhaust gas as ambient air is drawn into the mixing chamber inside the second venturi member 22. The exhaust gas passes through a turbulator or mixer/diffuser device 50 which is attached to the end of the exhaust pipe 12 which will blend the exhaust plume with surrounding ambient air within the mixing chamber. This reduces the outlet temperatures to an acceptable level.

This system provides a simple design which achieves a temperature goal within a short distance and has an outlet within the height of the rear axle tractor centerline. This system allows the tail pipe to enter the mixing chamber and act as a venturi which creates a low pressure zone in which ambient air is mixed with the exhaust flow to reduce the gas temperature and shield from crop or debris.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An exhaust assembly comprising:
an exhaust pipe having an inlet end and an outlet end;
a first venturi member having an inlet end adapted to receive exhaust gas from an engine, and having an outlet end received by the inlet end of the exhaust pipe, the exhaust pipe inlet end being spaced apart from and surrounding the outlet end of the first venturi member; and
a second venturi member having an inlet end receiving the outlet end of the exhaust pipe, and having an outlet end opening to the atmosphere, the inlet end of the second venturi member being spaced apart from and surrounding the outlet end of the exhaust pipe, the inlet end of the second venturi member and the outlet end of the exhaust pipe forming an annular opening which is exposed to the atmosphere.

2. The exhaust assembly of claim 1, wherein:
a diffuser/mixer is mounted at the outlet end of the exhaust pipe.

3. The exhaust assembly of claim 2, wherein:
the diffuser/mixer projects into and is received by an upstream end of the second venturi member.

4. The exhaust assembly of claim 1, further comprising:
a shield pipe surrounding a portion of the exhaust pipe.

5. The exhaust assembly of claim 4, further comprising:
a shield member covering a portion of the first venturi member.

6. The exhaust assembly of claim 5, wherein:
the shield member has a first end mounted to the exhaust pipe.

7. The exhaust assembly of claim 1, wherein:
the first venturi member has a larger diameter upstream end and a smaller diameter downstream end.

8. The exhaust assembly of claim 1, wherein:
the second venturi member has a smaller diameter upstream end and a larger diameter downstream end.

9. The exhaust assembly of claim 1, wherein:
the first and second venturi members operate to combine ambient air with exhaust gases.

10. An exhaust assembly comprising:
an exhaust pipe having an inlet end and an outlet end;
a first venturi member having an inlet end adapted to receive exhaust gas from an engine, and having an outlet end received by the inlet end of the exhaust pipe, the exhaust pipe inlet end being spaced apart from and surrounding the outlet end of the first venturi member;
a second venturi member having an inlet end receiving the outlet end of the exhaust pipe, and having an outlet end opening to the atmosphere, the inlet end of the second venturi member being spaced apart from and surrounding the outlet end of the exhaust pipe, the inlet end of the second venturi member and the outlet end of the exhaust pipe forming an annular opening which is exposed to the atmosphere;
a diffuser/mixer is mounted at the outlet end of the exhaust pipe; and
a shield pipe, the shield pipe surrounding a portion of the exhaust pipe, the first and second venturi members operating to combine ambient air with exhaust gases.

11. The exhaust assembly of claim 10, further comprising:
a shield member having a first end mounted to the shield pipe, the shield member covering a portion of the first venturi member.

12. The exhaust assembly of claim 10, wherein:
the first venturi member has a larger diameter upstream end and a smaller diameter downstream end.

13. The exhaust assembly of claim 10, wherein:
the second venturi member has a smaller diameter upstream end and a larger diameter downstream end.

* * * * *